United States Patent
Büttner et al.

(10) Patent No.: US 11,308,020 B2
(45) Date of Patent: Apr. 19, 2022

(54) METHOD FOR DATA COMMUNICATION BETWEEN FIELDBUS DEVICES AND A CONTROL DESK OF AN AUTOMATION SYSTEM, AND AUTOMATION SYSTEM

(71) Applicant: Beckhoff Automation GmbH, Verl (DE)

(72) Inventors: Holger Büttner, Berlin (DE); Andreas Rasche, Berlin (DE); Alexander Barth, Verl (DE)

(73) Assignee: Beckhoff Automation GmbH, Verl (DE)

( * ) Notice: Subject to any disclaimer, the term of this patent is extended or adjusted under 35 U.S.C. 154(b) by 0 days.

(21) Appl. No.: 16/938,691

(22) Filed: Jul. 24, 2020

(65) Prior Publication Data

US 2021/0026792 A1 Jan. 28, 2021

(30) Foreign Application Priority Data

Jul. 25, 2019 (DE) ...................... 10 2019 120 103.9

(51) Int. Cl.
*G06F 13/40* (2006.01)
*H04L 29/06* (2006.01)
(Continued)

(52) U.S. Cl.
CPC .......... *G06F 13/4068* (2013.01); *H04L 69/03* (2013.01); *H04L 69/08* (2013.01); *H04L 2012/4026* (2013.01)

(58) Field of Classification Search
None
See application file for complete search history.

(56) References Cited

U.S. PATENT DOCUMENTS 10,178,177 B2 * 1/2019 McLaughlin ........... H04L 63/02
10,845,786 B2 * 11/2020 Chauvet ................ G06F 9/5005
(Continued)

FOREIGN PATENT DOCUMENTS

CN 105530240 A * 4/2016
CN 105530240 A 4/2016
(Continued)

OTHER PUBLICATIONS

'Machine Translation of Chinese Patent Application CN105530240A' Apr. 2016. (Year: 2016).*
(Continued)

*Primary Examiner* — Steven G Snyder
(74) *Attorney, Agent, or Firm* — Dorsey & Whitney LLP

(57) ABSTRACT

A method for data communication between fieldbus devices and a control desk of an automation system by way of a data communication unit includes a first transmission step of the control desk transmitting data communication objects on the basis of the OPC UA protocol to first and/or second fieldbus device, and a first reception step of receiving the data communication objects on the basis of the OPC UA protocol. The data communication unit maps the data communication objects on the basis of the OPC UA protocol on first data communication objects on the basis of the fieldbus protocol. In a second transmission step, the data communication unit transmits the data communication objects on the basis of the fieldbus protocol to the first and/or second fieldbus device. In a second reception step, the first and/or the second fieldbus device receives the data communication objects on the basis of the fieldbus protocol.

15 Claims, 3 Drawing Sheets

(51) Int. Cl.
*H04L 69/00* (2022.01)
*H04L 69/08* (2022.01)
*H04L 12/40* (2006.01)

(56) References Cited

U.S. PATENT DOCUMENTS

| | | | |
|---|---|---|---|
| 2016/0127514 A1 | 5/2016 | Maksumov et al. | |
| 2017/0163444 A1* | 6/2017 | McLaughlin | H04L 67/12 |
| 2018/0024537 A1* | 1/2018 | Chauvet | G06F 9/4881 |
| | | | 718/104 |
| 2018/0299873 A1* | 10/2018 | Chauvet | G05B 19/4185 |
| 2018/0316729 A1* | 11/2018 | Chauvet | G06F 9/50 |
| 2019/0297160 A1* | 9/2019 | Harriman | H04L 67/28 |
| 2020/0389520 A1* | 12/2020 | Mayer | H04L 67/1031 |
| 2021/0029029 A1* | 1/2021 | Mehmedagic | H04L 63/0218 |
| 2021/0081346 A1* | 3/2021 | Nixon | G06F 13/4027 |

FOREIGN PATENT DOCUMENTS

| | | | |
|---|---|---|---|
| CN | 110808904 A | * | 2/2020 |
| CN | 112311808 A | * | 2/2021 |

OTHER PUBLICATIONS

'OPC UA based Field Device Integration' by Grossmann et al., SICE Annual Conference 2008. (Year: 2008).*
'Process Automation Device Information Model' by FieldComm Group, Feb. 2019. (Year: 2019).*
'Profinet & OPC UA: A 'Map' Made in Heaven' by Profinews, May 9, 2019. (Year: 2019).*
'OPC Unified Architecture—Efficiency and Standards' by Mahnke et al., 2009. (Year: 2009).*

* cited by examiner

METHOD FOR DATA COMMUNICATION BETWEEN FIELDBUS DEVICES AND A CONTROL DESK OF AN AUTOMATION SYSTEM, AND AUTOMATION SYSTEM

CROSS-REFERENCE TO RELATED APPLICATIONS

This patent application claims priority of German patent application DE 10 2019 120 103.9, filed Jul. 25, 2019, entitled VERFAHREN ZUR DATENKOMMUNIKATION ZWISCHEN FELDBUSGERÄTEN UND EINEM LEITSTAND EINES AUTOMATISIERUNGSSYSTEMS UND AUTOMATISIERUNGSSYSTEM, which is incorporated by reference herein, in the entirety and for all purposes.

FIELD

The invention relates to a method for data communication between fieldbus devices and a control desk of an automation system. Further, the invention relates to an automation system, configured to carry out a method for data communication between fieldbus devices and a control desk of an automation system.

BACKGROUND

In light of the "Industrie 4.0" initiative and Internet of Things (IoT) ambitions, it is possible to register a desire for a continuously increasing degree of digitization and centralization of industrial production and automation processes in industrial production. The development of industrial production installations tends towards intelligent production installations, in which devices communicate with one another, adapt processes to one another and independently regulate process procedures. Processes can be tracked in a cloud, data can be analysed in centralised fashion and procedures can be controlled via the Internet. This requires a complex data communication structure which allows large amounts of data and information to be transmitted with few losses and a low susceptibility to errors.

A further trend can be identified in the form of continuously increasing inter-compatibility of devices of different types and from different manufacturers. The goal is to develop a production installation in which different components from very different manufacturers are able to be combined with one another as desired and are able to be replaced by one another, with only a minimum outlay in terms of programming effort.

In the field of automation technology, the service-oriented Open Platform Communication Unified Architecture (OPC UA) data communication standard has been able to establish itself for providing uniform data communication in view of data communication and information transfer between the components of the control level and components of the process level in automation systems. OPC UA is based on open communication standards and consequently guarantees a reliable, robust communication between clients and servers and between servers and servers. In the context of the automation hierarchy, OPC UA is currently used for vertical communication between the control level and the process level of an automation system. The OPC UA protocol standard offers an open data communication standard, which facilitates standardized data communication and information transfer between elements of the control level and elements of the process level or fieldbus level of an automation system. It is an object to achieve data communication and information transfer between any devices, independent of manufacturer and without comprehensive programming outlay.

Communication between components of the control level and components of the process level or fieldbus level by way of the OPC UA protocol standard assumes a mapping of elements of the OPC UA protocol standard on elements of a communication protocol of the process level.

For the purposes of standardizing the data communication and information transfer by the OPC UA protocol standard, organisations, such as, for example, the PLCopen consortium, can offer standardized information models, which are also referred to as companion specifications, by which machine-related information and services are transferable into the OPC UA protocol standard. Such companion specifications define mapping specifications for mapping domain-specific or device-specific communication standards on the OPC UA protocol standard for individual groups of components of automation systems. For example, the companion specification defined by the PLCopen consortium defines compatibility between the OPC UA protocol standard and communication standards for programmable logic controllers PLC.

The use of the OPC UA protocol standard with corresponding companion specifications for certain device classes of an automation installation facilitates the manufacturer-overarching use of devices of the corresponding device class without additional programming outlay. The companion specification defines a uniform data structure in relation to the OPC UA protocol standard for devices of the respective device class. An individual adaptation of the data structure for individual devices that deviates from the predefined companion specifications is currently not achievable without great programming outlay.

In modern automation systems, an increased interest can be identified in data communication and information transfer between elements of the control level and individual fieldbus devices, such as bus terminals or individual sensors and actuators of the automation system. Companion specifications allow the definition of a uniform data structure for all devices of a device class. However, individual adaptation of the data structures for individual devices that deviates from the data structures defined in the companion specifications is currently not achievable without great programming outlay.

For data communication on the basis of the OPC UA protocol standard between elements of the control level and individual fieldbus devices, it is currently necessary to use the OPC UA protocol standard for the entire data connection between the control level and the corresponding fieldbus device. The OPC UA protocol standard is not real-time capable. In other aspects, too, the OPC UA protocol standard is unable to replace a fieldbus protocol like-for-like. Therefore, data communication only on the basis of the OPC UA protocol standard is unable to lead to satisfactory results in all cases.

SUMMARY

The present invention provides an improved method for data communication between fieldbus devices and a control desk of an automation system, and automation system.

It is therefore an object of the invention to provide a method for data communication between fieldbus devices and a control desk of an automation system, which is able to unify the advantages provided by the OPC UA protocol standard and the advantages provided by an established fieldbus protocol. It is further an object of the invention to provide an automation system with data communication between fieldbus devices and a control desk of an automation system, which unifies the advantages of the OPC UA protocol standard and the advantages of an established fieldbus protocol.

According to one aspect, a method for data communication between fieldbus devices and a control desk of an automation system is provided, wherein the automation system comprises a first fieldbus device, a second fieldbus device, a control unit connected via a fieldbus system to the first fieldbus device and the second fieldbus device for controlling the first fieldbus device and the second fieldbus device, and a control desk connected to the control unit by a data bus. The control unit comprises a data communication unit for data communication between the first fieldbus device and the second fieldbus device and the control desk by way of the exchange of data communication objects. The data communication unit has a first data communication interface connected to the control desk for transmitting and receiving data communication objects on the basis of an OPC UA protocol standard, a second data communication interface connected to the first fieldbus device and the second fieldbus device for transmitting and receiving data communication objects on the basis of a fieldbus protocol, and a mapping unit connected to the first data communication interface and the second data communication interface for mapping data communication objects on the basis of the OPC UA protocol standard and data communication objects on the basis of the fieldbus protocol on one another.

The mapping unit is configured to map first data communication objects on the basis of the OPC UA protocol standard and first data communication objects on the basis of the fieldbus protocol on one another according to a first mapping specification, and to map second data communication objects on the basis of the OPC UA protocol standard and second data communication objects on the basis of the fieldbus protocol on one another according to a second mapping specification. The first mapping specification defines a mapping of the first data communication objects on the basis of the OPC UA protocol standard and the first data communication objects on the basis of the fieldbus protocol on one another, and the second mapping specification defines a mapping of the second data communication objects on the basis of the OPC UA protocol standard and the second data communication objects on the basis of the fieldbus protocol on one another.

The method comprises transmitting, by the control desk, first data communication objects on the basis of the OPC UA protocol standard to the first fieldbus device and/or transmitting, by the control desk, second data communication objects on the basis of the OPC UA protocol standard to the second fieldbus device; receiving the first data communication objects on the basis of the OPC UA protocol standard and/or receiving the second data communication objects on the basis of the OPC UA protocol standard by the first data communication interface; mapping the first data communication objects on the basis of the OPC UA protocol standard, received by way of the first data communication interface, on first data communication objects on the basis of the fieldbus protocol according to the first mapping specification by the mapping unit and/or mapping the second data communication objects on the basis of the OPC UA protocol standard, received by way of the first data communication interface, on second data communication objects on the basis of the fieldbus protocol according to the second mapping specification by the mapping unit; transmitting, by the second data communication interface, the first data communication objects on the basis of the fieldbus protocol to the first fieldbus device and/or transmitting, by the data communication unit via the second data communication interface, the second data communication objects on the basis of the fieldbus protocol to the second fieldbus device; and receiving the first data communication objects on the basis of the fieldbus protocol by the first fieldbus device and/or receiving the second data communication objects on the basis of the fieldbus protocol by the second fieldbus device.

This achieves the technical advantage of being able to provide a method for data communication between fieldbus devices and a control desk of an automation system, which combines both the advantages of the OPC UA protocol standard and the advantages of a commercially available fieldbus protocol. The data communication unit, which is arranged in the control unit of the automation system and which brings about mapping between data communication objects of the OPC UA protocol standard and data communication objects of the fieldbus protocol, can use a known fieldbus protocol for the data communication between the control desk and the fieldbus devices of the automation system, for the communication path between the control desk and the control unit of the OPC UA protocol standard and for the data communication path between the control unit and the fieldbus devices. This allows the advantages of the OPC UA protocol standard and the advantages of a fieldbus protocol to be combined.

The OPC UA protocol standard has established itself as a standard for data communication between subscribers of an automation system, in particular between subscribers of the control level and subscribers of further levels of the automation system, and facilitates inter-compatibility between various devices, in particular also from different manufacturers within an automation system.

The OPC UA protocol standard facilitates data communication, for example via the Internet, and centralized data analysis of process data or other data of interest to the process management or company management in a centralized data analysis layer, for example a cloud or server system. Currently, however, the OPC UA protocol standard is not real-time capable and facilitates no data communication while meeting the precondition of determined, hard real-time processes.

Moreover, the scope of the protocol of the OPC UA protocol standard is substantially more comprehensive than the scope of the protocol of a conventional fieldbus protocol. This assumes that, for data communication by the OPC UA protocol standard, the respective communication subscribers have powerful processors and memories in order to be able to implement the comparatively comprehensive protocol of the OPC UA protocol standard.

In contrast thereto, the fieldbus protocol of a conventional fieldbus system is adapted for communication, in particular in real time, between comparatively simple fieldbus devices, for example sensors or actuators with comparatively low processor capability, and so a conventional fieldbus protocol provides capable and, in particular, real-time-capable data communication between fieldbus devices among one another and between fieldbus devices and the control unit of an automation system.

Consequently, the present invention can provide data communication between a control desk and fieldbus devices of an automation system, which combines the inter-compatibility and the standardizability, provided by the OPC UA protocol standard, with the capable data communication for fieldbus devices, provided by a commercially available fieldbus protocol.

The mapping unit of the data communication unit is configured to use mapping specifications to map data communication objects of the OPC UA protocol standard and data communication objects of the respective fieldbus protocol on one another. Here, the mapping unit is configured in such a way that mappings of data communication objects of the OPC UA protocol standard and of the respective fieldbus protocol can be carried out on the basis of a plurality of mapping specifications.

Consequently, an individually adapted mapping specification can be provided to each of the fieldbus devices involved in data communication with the control desk. This facilitates mapping by the mapping unit of data communication objects that are individually adapted to each of the fieldbus devices involved in data communication on corresponding data communication objects on the basis of the OPC UA protocol standard. This facilitates individual data communication between the control desk and an individual fieldbus device.

Even though the data communication unit is arranged in the control unit, the described data communication between the control desk and the fieldbus devices as per the method differs from data communication between the control desk and the control unit in that, in the method, the control unit is not involved in the data communication and does not contribute to the latter. This is advantageous in that, as per the method, each individual fieldbus device can be individually addressed by the control desk and consequently it is possible to achieve direct data communication between the control desk and the respective fieldbus device. Indirect data communication, in which data of the respective fieldbus device are exchanged with the control desk via the control unit, can consequently be avoided.

Compared to data communication on the basis of the OPC UA protocol standard, in which use is made of companion specifications which are used to define mapping specifications for an entire device class, the advantage achieved in the present case is that, via the mapping specifications, it is possible to individually create a mapping of data communication objects of a respective fieldbus device on corresponding data communication objects on the basis of the OPC UA protocol standard on an individual basis for each of the fieldbus devices subscribed to the data communication. Consequently, individually adapted data communication can be determined for each fieldbus device. As a result of this, the data of the fieldbus device accessible by the control desk and the data of the fieldbus device only accessible by way of the control unit can be defined individually for each fieldbus device.

The data communication via the data communication unit as per the method runs in parallel with or independently of the data communication between the control unit and the fieldbus devices of the automation installation.

Below, data communication is an information transfer on the basis of a data transmission. The data communication differs from pure data transmission by way of an additional transfer of information content contained in the transmitted data. Transmission of information content assumes that information transmitted by a communication subscriber is not only transferred to the respective other communication subscriber but it is also understood by the communication subscriber receiving the information.

In the mapping of the data communication objects of the OPC UA protocol standard and the data communication objects on the basis of the fieldbus protocol, as undertaken by the mapping unit, the semantic content of the information transferred by the respective data communication objects is consequently maintained in order to be able to ensure data communication between the control desk and the respective fieldbus device.

Consequently, mapping of the data communication objects is not merely restricted to converting different data structures of different communication protocols, instead it also represents a transfer of information content from a first data communication protocol, for example the OPC UA protocol standard, to a second data communication protocol, for example any fieldbus protocol, in which the semantic content of the information to be transferred is maintained. Consequently, data communication between the control desk and the fieldbus devices can be achieved, within the scope of which the information transmitted by the control desk is received and understood by the respective fieldbus devices.

Below, a data communication object is an information unit comprising self-contained information. Here, an information unit can be a single numerical value, for example a measurement value, a set of numbers or values, a function for mapping numerical values on other numerical values, a combination of numbers, a word, a sentence, a word combination or an entity of any other design, which comprises information content. This data communication object can be configured in accordance with the respectively used data communication protocol. According to the OPC UA protocol standard, which has an object-oriented structure, a data communication object can be, for example, a value, for example a measurement value, a function, a property, an object with corresponding properties or a class of objects. Further, a data communication object can be a write command or a read command, for example.

The first and second data communication objects are each adapted for the corresponding first and second fieldbus devices and, depending on the first and second fieldbus devices, may differ from one another. By way of example, the first and second fieldbus devices can be different sensors, for example a temperature sensor and a pressure sensor. The corresponding first and second data communication objects can consequently differ in that these comprise temperature data and pressure data, for example. Alternatively, the first and second fieldbus devices can also be sensors of the same type but from different manufacturers, which can consequently have different data communication objects on account of the different data structures of the respective sensors. Alternatively, the first and second fieldbus devices can also be a sensor and an actuator, respectively, and the corresponding data communication objects can consequently differ on account of the different requirements for sensors and actuators or the different configurations of sensors and actuators.

According to the mapping specification, the individual data communication objects on the basis of the OPC UA protocol standard and the data communication objects on the basis of the respectively used fieldbus protocol are mapped on one another in such a way that the information content contained in the respective data communication objects is maintained in undistorted fashion.

Below, a mapping specification is a specification which sets out how individual data communication objects on the basis of the OPC UA protocol standard and individual data communication objects on the basis of a respective fieldbus protocol should be mapped on one another such that the respective information content of the data communication objects to be mapped is maintained. Below, a mapping specification can additionally comprise a definition of data communication objects both on the basis of the OPC UA protocol standard and on the basis of the respectively used fieldbus protocol.

As a result of the definition, explicitly adapted to the corresponding fieldbus device, of the data communication objects to be used for this fieldbus device both on the basis of the OPC UA protocol standard and on the basis of the respectively used fieldbus protocol, it is possible to ensure data communication between the control desk and the corresponding fieldbus device. The mapping specification can further comprise a device description of the corresponding fieldbus device, in which, on the basis of the OPC UA protocol standard, the respective fieldbus device is identified and the properties of the fieldbus device are described.

Below, a control desk is a subscriber of a control level of an automation system. According to the automation hierarchy, a control level can comprise a process control level, a plant control level, a production control level and a plant management control level.

Below, a fieldbus device is a device of the field level of an automation system within the meaning of the automation hierarchy.

According to one embodiment, the method further comprises transmitting first data communication objects on the basis of the fieldbus protocol by the first fieldbus device and/or transmitting second data communication objects on the basis of the fieldbus protocol by the second fieldbus device to the control desk; receiving the first data communication objects on the basis of the fieldbus protocol and/or the second data communication objects on the basis of the fieldbus protocol by the second data communication interface; mapping the first data communication objects on the basis of the fieldbus protocol, received by way of the second data communication interface, on first data communication objects on the basis of the OPC UA protocol standard according to the first mapping specification by the mapping unit and/or mapping the second data communication objects on the basis of the fieldbus protocol, received by way of the second data communication interface, on second data communication objects on the basis of the OPC UA protocol standard according to the second mapping specification by the mapping unit; transmitting, by the first data communication interface, the first data communication objects on the basis of the OPC UA protocol standard and/or transmitting, by the first data communication interface, the second data communication objects on the basis of the OPC UA protocol standard to the control desk; and receiving the first data communication objects on the basis of the OPC UA protocol standard and/or receiving the second data communication objects on the basis of the OPC UA protocol standard by the control desk.

This obtains the technical advantage of being able to provide a method for data communication between a control desk and fieldbus devices of an automation system, in which it is possible to transmit both information from the control desk to the fieldbus devices and information from the fieldbus devices to the control desk. The data communication objects on the basis of the respectively used fieldbus protocol, transmitted by the fieldbus devices, can be mapped on corresponding data communication objects on the basis of the OPC UA protocol standard by the mapping unit according to the mapping specifications adapted to the respective fieldbus devices and these data communication objects on the basis of the OPC UA protocol standard can be transmitted to the control desk. As a result of this, the information transmitted by the fieldbus devices can be transmitted to the control desk.

This can obtain the technical advantage of being able to provide more complex data communication between the control desk and the fieldbus devices of the automation system, in which it is possible both to transfer information from the control desk to the automation devices and to transmit information from the automation devices to the control desk.

Here, the mapping unit is configured to map the received data communication objects on the basis of the OPC UA protocol standard on corresponding data communication objects on the basis of the respectively used fieldbus protocol in accordance with the mapping specifications respectively disposed in the mapping unit. Further, the mapping unit is configured to map the received data communication objects on the basis of the respectively used fieldbus protocol on corresponding data communication objects on the basis of the OPC UA protocol standard.

Mapping the data communication objects of the one data communication protocol on data communication objects of the respective other data communication protocol consequently is implemented in a manner comparable to a simultaneous translation if the data communication unit receives appropriate data communication objects within the scope of data communication between the control desk and fieldbus devices. As a result of the unique assignment of the data communication objects on the basis of the OPC UA protocol standard and the corresponding data communication objects on the basis of the respectively used fieldbus protocol in the corresponding mapping specifications, it is possible to provide unique data communication between the control desk and the respective fieldbus devices with an undistorted information transfer.

According to a second aspect, a method for data communication between fieldbus devices and a control desk of an automation system is provided, wherein the automation system comprises a first fieldbus device, a second fieldbus device, a control unit connected via a fieldbus system to the first fieldbus device and the second fieldbus device for controlling the first fieldbus device and the second fieldbus device, and a control desk connected to the control unit by a data bus. The control unit comprises a data communication unit for data communication between the first fieldbus device, the second fieldbus device and the control desk by way of the exchange of data communication objects. The data communication unit has a first data communication interface connected to the control desk for transmitting and receiving data communication objects on the basis of an OPC UA protocol standard, a second data communication interface connected to the first fieldbus device and the second fieldbus device for transmitting and receiving data communication objects on the basis of a fieldbus protocol, and a mapping unit connected to the first data communication interface and the second data communication interface for mapping data communication objects on the basis of the OPC UA protocol standard and data communication objects on the basis of the fieldbus protocol on one another.

The mapping unit is configured to map first data communication objects on the basis of the OPC UA protocol standard and first data communication objects on the basis of the fieldbus protocol on one another according to a first mapping specification, and to map second data communication objects on the basis of the OPC UA protocol standard and second data communication objects on the basis of the fieldbus protocol on one another according to a second mapping specification. The first mapping specification defines a mapping of the first data communication objects on the basis of the OPC UA protocol standard and the first data communication objects on the basis of the fieldbus protocol on one another, and the second mapping specification defines a mapping of the second data communication objects on the basis of the OPC UA protocol standard and the second data communication objects on the basis of the fieldbus protocol on one another.

The method comprises transmitting first data communication objects on the basis of the fieldbus protocol by the first fieldbus device and/or transmitting second data communication objects on the basis of the fieldbus protocol by the second fieldbus device to the control desk in a first signal transmission step; receiving the first data communication objects on the basis of the fieldbus protocol and/or the second data communication objects on the basis of the fieldbus protocol by the second data communication interface in a first signal reception step; mapping the first data communication objects on the basis of the fieldbus protocol, received by way of the second data communication interface, on first data communication objects on the basis of the OPC UA protocol standard according to the first mapping specification by the mapping unit and/or mapping the second data communication objects on the basis of the fieldbus protocol, received by way of the second data communication interface, on second data communication objects on the basis of the OPC UA protocol standard according to the second mapping specification by the mapping unit in a data communication object mapping step; transmitting, by the first data communication interface, the first data communication objects on the basis of the OPC UA protocol standard and/or transmitting, by the first data communication interface, the second data communication objects on the basis of the OPC UA protocol standard to the control desk in a second signal transmission step; and receiving the first data communication objects on the basis of the OPC UA protocol standard and/or receiving the second data communication objects on the basis of the OPC UA protocol standard by the control desk in a second signal reception step.

According to a third aspect, an automation system is provided, wherein the automation system comprises a first fieldbus device, a second fieldbus device, a control unit connected via a fieldbus system to the first fieldbus device and the second fieldbus device for controlling the first fieldbus device and the second fieldbus device and a control desk, a control desk connected to the control unit via a data bus, and a data communication unit configured in the control unit for data communication between the first fieldbus device, second fieldbus devices and the control desk by way of an exchange of data communication objects. The data communication unit comprises a first data communication interface connected to the control desk for transmitting and receiving data communication objects on the basis of the OPC UA protocol standard, a second data communication interface connected to the first fieldbus device and the second fieldbus device for transmitting and receiving data communication objects on the basis of a fieldbus protocol, and a mapping unit connected to the first data communication interface and the second data communication interface and configured to map data communication objects on the basis of the OPC UA protocol standard and data communication objects on the basis of the fieldbus protocol on one another.

The data communication unit is configured to receive first data communication objects, transmitted from the control desk to the first fieldbus device on the basis of the OPC UA protocol standard, and/or second data communication objects transmitted from the control desk to the second fieldbus device on the basis of the OPC UA protocol standard via the first data communication interface; to map the first data communication objects on the basis of the OPC UA protocol standard on first data communication objects on the basis of the fieldbus protocol according to a first mapping specification by way of the mapping unit and/or to map the second data communication objects on the basis of the OPC UA protocol standard on second data communication objects on the basis of the fieldbus protocol according to a second mapping specification by way of the mapping unit; and to transmit, by the second data communication interface, the first data communication objects on the basis of the fieldbus protocol to the first fieldbus device and/or the second data communication objects on the basis of the fieldbus protocol to the second fieldbus device. The first mapping specification defines a mapping of the first data communication objects on the basis of the OPC UA protocol standard and the first data communication objects on the basis of the fieldbus protocol on one another, and the second mapping specification defines a mapping of the second data communication objects on the basis of the OPC UA protocol standard and the second data communication objects on the basis of the fieldbus protocol on one another.

This obtains the technical advantage of being able to provide an automation system that facilitates data communication between a control desk and fieldbus devices, which links the advantages of the OPC UA protocol standard with the advantages of a fieldbus protocol.

The data communication unit arranged in the control unit comprises a mapping unit and is configured by the mapping unit to map the data communication objects on the basis of the OPC UA protocol standard, transmitted by the control desk to the respective fieldbus devices, on corresponding data communication objects on the basis of a respectively used fieldbus protocol in accordance with a corresponding mapping specification. Mapping the data communication objects on the basis of the OPC UA protocol standard on corresponding data communication objects on the basis of a used fieldbus protocol facilitates data communication between the control desk and the respective fieldbus devices, in which the information transmitted by the control desk is transferred with undistorted information content to the addressed fieldbus devices.

The OPC UA protocol standard is used for the data communication path between the control desk and the control unit while a suitable fieldbus protocol is used for the data communication path between the control unit and the individual fieldbus devices. By using the different data communication protocols, it is possible to exploit the advantages of the individual data communication protocols.

Thus, for example, the OPC UA protocol standard facilitates standardization of the data communication within an automation system and further facilitates a centralized data analysis, in which the data transfer is also realizable in wireless fashion via the Internet to a suitable cloud or server system where necessary. A fieldbus protocol which is designed for data communication between fieldbus devices or between fieldbus devices and a programmable logic controller of an automation system facilitates determined real-time-capable data communication and provides a data communication protocol with a comparatively small protocol scope, which is consequently also executable on fieldbus devices with little processor power.

By way of the mapping unit, the data communication unit is configured to map, upon reception by the first data communication interface, by the mapping unit, the data communication objects, transmitted from the control desk to the respective fieldbus devices, on the basis of the OPC UA protocol standard on corresponding data communication objects on the basis of the respectively used fieldbus protocol in accordance with the respective mapping specification. Consequently, mapping by the mapping unit is carried out in a manner corresponding to a simultaneous translation and is respectively carried out upon reception of the corresponding data communication objects.

As already described above, the mapping specification comprises a unique assignment of data communication objects on the basis of the OPC UA protocol standard and corresponding data communication objects on the basis of the respectively used fieldbus protocol. Further, the mapping specification can define corresponding data communication objects on the basis of the OPC UA protocol standard and data communication objects on the basis of the fieldbus protocol such that, by way of the defined data communication objects on the basis of the respective data communication protocol, data communication for the respective fieldbus device is facilitated.

Consequently, mapping specifications can be individually adapted to individual fieldbus devices. By way of the definition of the respective data communication objects on the basis of the OPC UA protocol standard and the data communication objects on the basis of the respectively used fieldbus protocol, the data accessible to the control desk can be defined for the corresponding fieldbus device. This can define individual data communication between the control desk and a certain fieldbus device, which facilitates undistorted information transmission between the control desk and the respective fieldbus device and exploits both the advantages of the OPC UA protocol standard and the advantages of a fieldbus protocol that has proven its worth.

EMBODIMENTS

According to one embodiment, the control unit is an external control unit, for example an external computing unit, and comprises a switching unit, for example a switch, for transferring signals for data communication, with the data communication unit being arranged in the switching unit.

This obtains the technical advantage of obtaining the greatest possible field of use for the method according to the invention and the automation system according to the invention.

According to one embodiment, the data communication unit is further configured to receive first data communication objects, transmitted from the first fieldbus device to the control desk, on the basis of the fieldbus protocol and/or second data communication objects, transmitted from the second fieldbus device to the control desk, on the basis of the fieldbus protocol via the second data communication interface, to map the first data communication objects on the basis of the fieldbus protocol on first data communication objects on the basis of the OPC UA protocol standard according to the first mapping specification by way of the mapping unit and/or to map the second data communication objects on the basis of the fieldbus protocol on second data communication objects on the basis of the OPC UA protocol standard according to the second mapping specification by way of the mapping unit and to transmit the first data communication objects on the basis of the OPC UA protocol standard and/or the second data communication objects on the basis of the OPC UA protocol standard to the control desk by the first data communication interface.

This obtains the technical advantage of being able to provide an automation system which facilitates comprehensive data communication between a control desk and fieldbus devices of an automation system, in which it is possible to transmit both information from the control desk to the fieldbus devices and information from the fieldbus devices to the control desk.

According to one embodiment, the first mapping specification completely determines the first data communication objects on the basis of the OPC UA protocol standard and the first data communication objects on the basis of the fieldbus protocol for the data communication between the control desk and the first fieldbus device, wherein the second mapping specification completely determines the second data communication objects on the basis of the OPC UA protocol standard and the second data communication objects on the basis of the fieldbus protocol for the data communication between the control desk and the second fieldbus device.

This obtains the technical advantage of being able to determine the data structures for the first fieldbus device and for the second fieldbus device via the first and second mapping specifications of the first and second fieldbus devices. In the mapping specifications, the data communication objects on the basis of the OPC UA protocol standard and the data communication objects on the basis of the fieldbus protocol of the respective fieldbus devices are defined and a corresponding unique assignment between the respective data communication objects of the two data communication protocols is determined. The data communication objects on the basis of the OPC UA protocol standard and the data communication objects on the basis of the fieldbus protocol, defined in the mapping specification of a fieldbus device, define what information can be exchanged between the control desk and the respective fieldbus device.

The mapping specification of a fieldbus device consequently sets, for the respective fieldbus device, the data communication objects on the basis of the OPC UA protocol standard and the data communication objects on the basis of the fieldbus protocol that can be mapped on one another. Data communication objects on the basis of the OPC UA protocol standard or data communication objects on the basis of the fieldbus protocol which are not defined in the mapping specification and for which there consequently is no unique assignment to corresponding data communication objects of the respective other data communication protocol cannot be exchanged between the control desk and the respective fieldbus device.

Should the control desk transmit a corresponding data communication object on the basis of the OPC UA protocol standard to the respective fieldbus device, the mapping unit, in accordance with the mapping specification defined for this specific fieldbus device, is thus unable to convert the data communication object on the basis of the OPC UA protocol standard, which was transmitted by the control desk but not defined in the mapping specification, into a corresponding data communication object on the basis of the fieldbus protocol. Consequently, the data communication unit is unable to transmit a corresponding data communication object on the basis of the fieldbus protocol to the respective fieldbus device. There is no data communication, i.e. no exchange of the information corresponding to the transmitted data communication object on the basis of the OPC UA protocol standard between the control desk and the corresponding fieldbus device.

Analogously, a data communication object on the basis of the fieldbus protocol, which is transmitted by the fieldbus device but not defined in the corresponding mapping specification of the respective fieldbus device, cannot be converted by the mapping unit into a corresponding data communication object on the basis of the OPC UA protocol standard and be transmitted from the data communication unit to the control desk. In this case, too, there is no data communication, i.e. no exchange of information between the fieldbus device and the control desk.

Consequently, the definition of the data communication objects available for the data communication between the control desk and a corresponding fieldbus device in the mapping specification can define the data of the respective fieldbus device that the control desk may access. This may be important, particularly in the case of safety-relevant data of the fieldbus device.

The data transfer on the data communication path between the control desk and the control unit in an automation system is usually implemented by an Internet connection, which is accessible by a plurality of subscribers. For safety-relevant data of the automation devices, there may be an interest in not transferring these sensitive data over an Internet connection in order to thus prevent data misuse.

Consequently, access of the control desk to data of the respective fieldbus device can be restricted by defining the data communication objects on the basis of the OPC UA protocol standard and the data communication objects on the basis of the respectively used fieldbus protocol which are available for the data communication between the control desk and a specific fieldbus device. Data communication and transfer of information between the control desk and the fieldbus devices can only be carried out by way of the data communication objects defined in the respective mapping specification for the corresponding fieldbus device. Information which is not defined in the form of the corresponding data communication objects both on the basis of the OPC UA protocol standard and on the basis of the respectively used fieldbus protocol in the specific mapping specification for the respective fieldbus device cannot be transmitted between the control desk and the respective fieldbus device.

According to one embodiment, data communication between the control desk and the first fieldbus device is restricted to an exchange of the first data communication objects, comprised by the first mapping specification, wherein data communication between the control desk and the second fieldbus device is exclusively restricted to an exchange of the second data communication objects, comprised by the second mapping specification.

This obtains the technical advantage of being able to restrict the data communication between the control desk and a fieldbus device by way of the certain data communication objects in the mapping specification defined for the fieldbus device. A transfer of data communication objects, both on the basis of the OPC UA protocol standard and on the basis of a fieldbus protocol, which are not defined in the mapping specification of a fieldbus device cannot occur between the control desk and the respective fieldbus device.

According to one embodiment, the data communication unit further comprises an installation unit for installing mapping specifications, wherein the first mapping specification and the second mapping specification are installed in the data communication unit by way of the installation unit, and wherein the first mapping specification and the second mapping specification are modifiable by way of an installation of modified mapping specifications.

This obtains the technical advantage of being able to install the first mapping specification and the second mapping specification in the data communication unit via the installation unit. As a result, a user can install a corresponding mapping specification in the data communication unit for any fieldbus device such that data communication between the control desk and the corresponding fieldbus device is subsequently facilitated.

Further, already existing mapping specifications can be modified by the renewed installation of modified mapping specifications. This provides the option of altering data communication between the control desk and the respective fieldbus device for already existing fieldbus devices and, for example, of expanding or restricting the data access of the control desk to the respective fieldbus device. The addition of additional data communication objects in the modified mapping specification can, for example, increase the transmittable information content of data communication between the control desk and the respective fieldbus device. By contrast, the information content of data communication can be reduced by deleting data communication objects from the modified mapping specification.

Further, new fieldbus devices can be introduced into the automation system and can be inserted into already existing data communication between the control desk and the fieldbus devices of the automation system by virtue of merely installing a mapping specification, defined for the fieldbus device newly introduced into the automation system, into the data communication unit. In the case of data communication between the control desk and the fieldbus device newly introduced into the automation system, the data communication unit can map the respective data communication objects on the basis of the OPC UA protocol standard and the data communication objects on the basis of the used fieldbus protocol on one another in accordance with the newly installed mapping specification by the mapping unit, and so data communication and transfer of information between the control desk and the newly introduced fieldbus device is facilitated. Comprehensive programming outlay, within the scope of which the newly inserted fieldbus device is introduced into the corresponding data communication or the corresponding data communication protocol, is not required.

According to one embodiment, a plurality of mapping specifications for data communication between the control desk and a plurality of fieldbus devices are installable by way of the installation unit in the data communication unit, wherein the data communication objects for at least one of the fieldbus devices are completely determined by each mapping specification.

This obtains the technical advantage of facilitating data communication between the control desk and a plurality of fieldbus devices by way of the data communication unit. By installing a plurality of mapping specifications into the data communication unit by way of the installation unit, the data communication unit is able to map data communication objects on the basis of the OPC UA protocol standard and data communication objects on the basis of a used fieldbus protocol on one another for a plurality of different fieldbus devices.

An individually adapted mapping specification can be installed for each individual fieldbus device intended to subscribe to the data communication between the control desk and the fieldbus devices of the automation system, and so data communication between the control desk and the corresponding fieldbus device is facilitated in accordance with this individually adapted mapping specification. Each of the mapping specifications can completely define the data communication between the control desk and the fieldbus device belonging to the mapping specification by virtue of restricting the data communication or the information exchange to the data communication objects defined in the mapping specification.

Information exchange can occur on the basis of a mapping specification exclusively by way of the data communication objects defined in the mapping specification. An information item that cannot be expressed in the data communication objects defined in the mapping specification cannot be exchanged on the basis of the mapping specification. Data communication and exchange of information without using a mapping specification is not possible. Consequently, the mapping specification defines the information content exchangeable between a control desk and a fieldbus device or a plurality of fieldbus devices.

Only one data communication unit is required for data communication between the control desk and a plurality of fieldbus devices on the basis of a plurality of different mapping specifications, which are respectively adapted to the different fieldbus devices. The data communication unit and, in particular, the mapping unit is further configured to provide data communication between the control desk and a plurality of fieldbus devices. Here, the data communication unit and, in particular, the mapping unit is configured to map data communication objects, transmitted from the control desk to a plurality of fieldbus devices, on data communication objects on the basis of the used fieldbus protocols in accordance with the corresponding mapping specifications of the fieldbus devices and to transmit said data communication objects to the corresponding fieldbus devices by the second data communication interface.

By virtue of a dedicated mapping specification being defined for each fieldbus device, the corresponding data communication between the control desk and the respective fieldbus device is individually adapted for each fieldbus device, and so the data access by the control desk can be individually defined for each fieldbus device. Moreover, data communication between the control desk and any number of very different fieldbus devices can be facilitated by virtue of a dedicated mapping specification being determined for each fieldbus device, said mapping specification only defining data communication objects applicable to this fieldbus device.

Thus, data communication between the control desk and sensors and actuators, for example, can be carried out by way of the same data communication unit by virtue of the different fieldbus devices and the different data communication objects connected thereto or the information transmittable in adapted fashion to the different fieldbus devices being taken into account only in the different mapping specifications. The data communication unit with the integrated mapping unit and the likewise integrated installation unit consequently facilitates flexible data communication between the control desk and very different fieldbus devices, for which individually adapted data communication and an individually adapted data access by the control desk are determined in each case.

According to one embodiment, the data communication objects for a plurality of fieldbus devices are completely determined by a mapping specification.

This obtains the technical advantage of being able to install the smallest possible number of different mapping specifications such that the smallest possible memory requirements of the data communication unit can be achieved. For fieldbus devices of the same type, which consequently communicate by way of the same data communication objects and therefore have an identical data structure, the data communication, i.e. the unique association of data communication objects on the basis of the OPC UA protocol standard and data communication objects on the basis of the used fieldbus protocol, can be combined in one mapping specification.

To this end, the common mapping specification can comprise the individual device identities such that a unique assignment of the individual fieldbus devices is facilitated. The data communication objects both on the basis of the OPC UA protocol standard and on the basis of the respectively used fieldbus protocol, listed in the mapping specification, consequently apply to all fieldbus devices to which the respective mapping specification applies. Consequently, the programming outlay for the mapping specifications can be reduced and excessive memory requirements of the data communication unit on account of storing a plurality of mapping specifications can be avoided.

According to one embodiment, the data communication objects for at least one control desk are completely determined by a mapping specification.

This obtains the technical advantage of defining, by way of an appropriate mapping specification, the information which a control desk, or a subscriber of the control desk, can exchange with a fieldbus device. This can restrict access of a control desk to certain fieldbus devices. Consequently, the information of a fieldbus device to which subscribers of a control desk have access to can be regulated.

A plurality of different mapping specifications can be created for a fieldbus device, said mapping specifications being respectively tailored to a certain subscriber of a control desk and facilitating access to different information items of the fieldbus device. Consequently, mapping specifications individually tailored to a subscriber can be created for each subscriber of a control desk, said mapping specifications defining the information content of individual fieldbus devices to which said subscriber of the control desk should have access. Then, different subscribers of the control desk can communicate with the same fieldbus device via different mapping specifications and exchange different information items with the fieldbus device or have access to different information items of the fieldbus device on the basis of the respective mapping specifications. Consequently, the access of the subscribers of the control desk to information of the fieldbus devices can be individualized by way of corresponding mapping specifications.

According to one embodiment, the data communication objects for at least one fieldbus device and at least one control desk are completely determined by a plurality of mapping specifications.

This obtains the technical advantage of allowing a control desk to communicate with a fieldbus device on the basis of a plurality of mapping specifications. Here, each mapping specification can define complementary data communication objects such that different information content can be exchanged between the control desk and the fieldbus device by way of each mapping specification. This can obtain the advantage of being able to extend or restrict the access of the control desk to information of the fieldbus device by way of installing additional mapping specifications or uninstalling already existing mapping specifications.

According to one embodiment, the control unit has a plurality of data communication units, each with a first data communication interface, a second data communication interface and a mapping unit, wherein a mapping specification or a plurality of mapping specifications is installed in the mapping unit of each data communication unit, and wherein data communication between the control desk and a fieldbus device or a plurality of fieldbus devices is facilitated by way of each data communication unit.

This obtains the technical advantage of being able to provide data communication with increased flexibility by virtue of a plurality of data communication units, each with a first data communication interface, a second data communication interface and a mapping unit, being able to be arranged on the control unit. Each data communication unit can provide data communication between the control desk and a plurality of fieldbus devices. This can obtain greater flexibility and simpler structuring of the data communication between the individual fieldbus devices and the control desk.

If a plurality of data communication units which can each bring about data communication between the control desk and at least one fieldbus device are used, data communication between the control desk and the corresponding fieldbus devices can be continued to be maintained via the further data communication units should one data communication unit malfunction. Moreover, the additional modularization in the form of the plurality of data communication units which are each responsible for the data communication between a number of fieldbus devices and the control desk can simplify the search for faults in the case of faulty data communication or a faulty mapping specification by virtue of each of the plurality of data communication units only having installed a reduced number of mapping specifications and hence a search for faults being able to be reduced to a smaller number of mapping specifications.

Moreover, dividing the data communication between the control desk and a plurality of fieldbus devices among various data communication units may lead to better distribution of the available processor power or of the available memory area and hence may lead to more capable data communication. In particular, the individual data communication units can be configured to communicate among one another.

According to one embodiment, the first fieldbus device and the second fieldbus device are a bus terminal, a sensor, an actuator or any other device of the automation system.

This obtains the technical advantage of being able to provide data communication between the control desk and fieldbus devices, such as, for example, a bus terminal, a sensor, an actuator or any other device of the field level of an automation system. This realizes flexible data communication with a wide field of use.

According to one embodiment, the control desk is an item of data processing equipment, in particular a PC, a laptop or a server unit, of the control level of the automation system, and is connected via a data bus to the first data communication interface.

This obtains the technical advantage of being able to provide data communication in a modern automation system. By virtue of the control desk being realizable by a diverse number of very different items of data processing equipment, it is possible to provide highly flexible data communication between the control desk and a plurality of fieldbus devices in a modern automation system.

According to one embodiment, the control desk comprises a plurality of items of data processing equipment which are connected to the first data communication interface, wherein the data communication unit is configured to provide a plurality of data communication instances between the plurality of items of external data processing equipment and the fieldbus devices of the automation system.

This obtains the technical advantage of being able to provide data communication between a plurality of fieldbus devices and a plurality of subscribers of the control level of an automation system. By way of the method according to the invention or in the automation system according to the invention, a plurality of subscribers of the control level can communicate via the data communication unit or a plurality of data communication units with a plurality of fieldbus devices by way of an exchange of data communication objects. This allows a plurality of subscribers of the control level to access data from very different fieldbus devices of the automation system. This obtains greater flexibility and an increased field of use of the method according to the invention or of the automation system according to the invention.

BRIEF DESCRIPTION OF THE DRAWINGS

The invention is explained more specifically on the basis of the accompanying figures. In detail.

DETAILED DESCRIPTION

Figure 1:
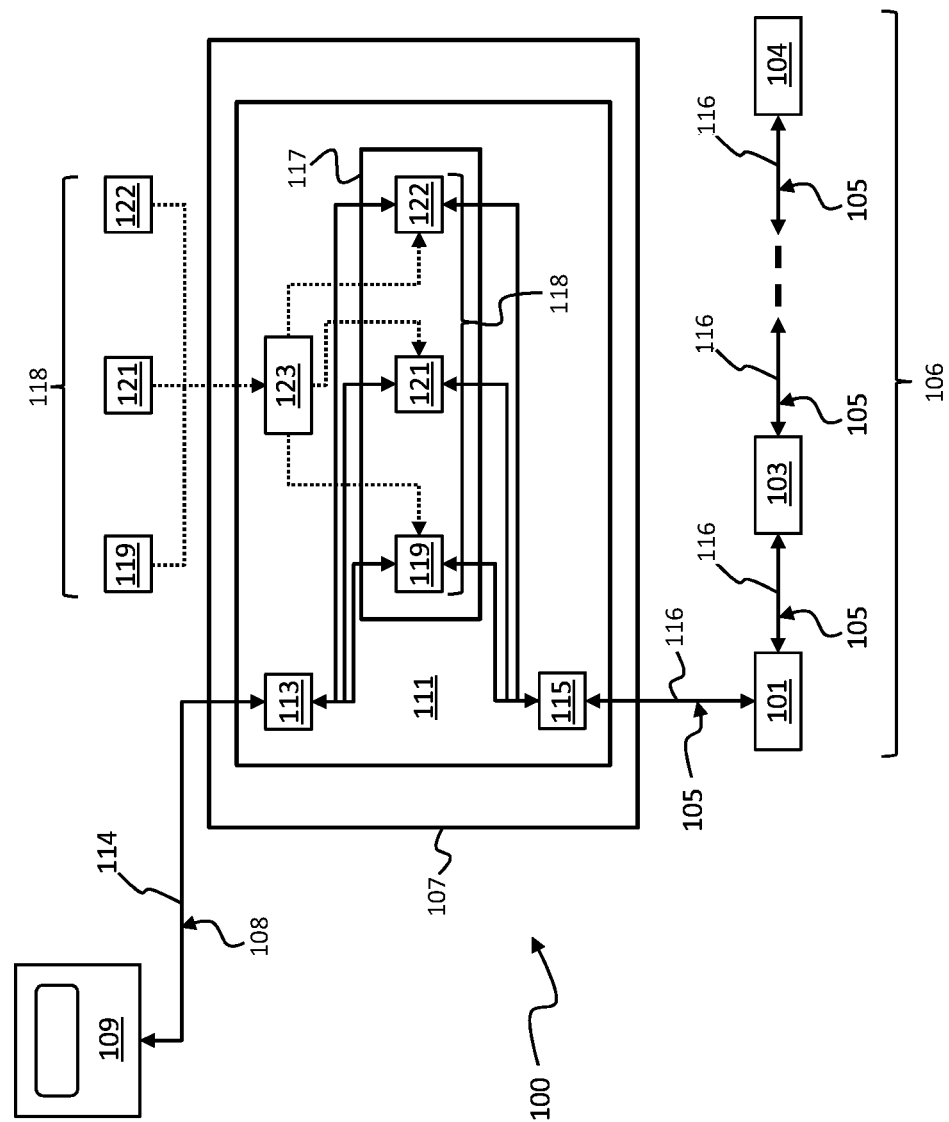
FIG. 1 shows a schematic illustration of an automation system according to one embodiment.

FIG. 1 shows a schematic illustration of an automation system 100 according to one embodiment.

According to the embodiment in FIG. 1, the automation system 100 comprises at least a first fieldbus device 101, a second fieldbus device 103, a control unit 107 connected via a fieldbus system 105 to the first fieldbus device 101 and the second fieldbus device 103 for controlling the first fieldbus device 101 and the second fieldbus device 103, a control desk 109 connected to the control unit via a data bus 108, and a data communication unit 111 configured in the control unit 107 for data communication between the first fieldbus device 101, the second fieldbus device 103 and the control desk 109 by way of an exchange of data communication objects. The data communication unit 111 comprises a first data communication interface 113 connected to the control desk 109 for transmitting and receiving data communication objects on the basis of the OPC UA protocol standard 114, a second data communication interface 115 connected to the first fieldbus device 101 and the second fieldbus device 103 for transmitting and receiving data communication objects on the basis of a fieldbus protocol 116, and a mapping unit 11, connected to the first data communication interface 113 and the second data communication interface 115 and configured to map data communication objects on the basis of the OPC UA protocol standard 114 and data communication objects on the basis of the fieldbus protocol 116 on one another.

The data communication unit 111 is configured at least to receive first data communication objects, transmitted from the control desk 109 to the first fieldbus device 101, on the basis of the OPC UA protocol standard 114 and/or second data communication objects, transmitted from the control desk 109 to the second fieldbus device 103, on the basis of the OPC UA protocol standard 114 via the first data communication interface 113, at least to map the first data communication objects on the basis of the OPC UA protocol standard 114 on first data communication objects on the basis of the fieldbus protocol 116 according to a first mapping specification 119 by way of the mapping unit 117 and/or to map the second data communication objects on the basis of the OPC UA protocol standard 114 on second data communication objects on the basis of the fieldbus protocol 116 according to a second mapping specification 121 by way of the mapping unit 117; and at least to transmit, by the second data communication interface 115, the first data communication objects on the basis of the fieldbus protocol 116 to the first fieldbus device 101 and/or the second data communication objects on the basis of the fieldbus protocol 116 to the second fieldbus device 103. At least the first mapping specification 119 defines a mapping of the first data communication objects on the basis of the OPC UA protocol standard 114 and the first data communication objects on the basis of the fieldbus protocol 116 on one another, and the second mapping specification 121 defines a mapping of the second data communication objects on the basis of the OPC UA protocol standard 114 and the second data communication objects on the basis of the fieldbus protocol 116 on one another.

In the embodiment in FIG. 1, the automation system 100 comprises, in addition to the first fieldbus device 101 and the second fieldbus device 103, at least one further third fieldbus device 104, which is connected via the fieldbus system 105 to the first fieldbus device 101, the second fieldbus device 103 and the control unit 107. Moreover, the data communication unit 111 arranged in the control unit 107 comprises an installation unit 123 for installing the mapping specifications 118 in the mapping unit 117.

In the embodiment in FIG. 1, the first mapping specification 119, the second mapping specification 121 and a third mapping specification 122 are installed in the mapping unit 117. The dotted arrows illustrate that the mapping specifications 118 installed in the mapping unit 117 were installed via the installation unit 123.

The first mapping specification 119 defines the unique assignment between data communication objects on the basis of the OPC UA protocol standard 114 and data communication objects on the basis of the used fieldbus protocol 116, exclusively for the first fieldbus device 101. The second mapping specification 121 defines a unique assignment between the data communication objects on the basis of the OPC UA protocol standard 114 and the data communication objects on the basis of the used fieldbus protocol 116, exclusively for the second fieldbus device 103. The third mapping specification 122 defines the unique assignment between the data communication objects on the basis of the OPC UA protocol standard 114 and the data communication objects on the basis of the used fieldbus protocol 116, exclusively for the third fieldbus device 104.

As an alternative to the embodiment in FIG. 1, the automation system 100 can comprise any number of fieldbus devices 106. Accordingly, the automation system 100 can further comprise any number of mapping specifications 118, which are installed in the mapping unit 117 or the data communication unit 111.

The data communication between the control desk 109, an item of data processing equipment which can be, in particular, a PC, a laptop, a mobile device or a cloud or server system, and the control unit 107 is realized on the basis of the OPC UA protocol standard 114 via a data bus 108. By way of example, the data bus 108 can be realized as an ethernet system and data transfer between the control desk 109 and the control unit 107 can be achieved, for example, via an Internet connection, in particular also in wireless fashion. To this end, the data communication unit 111 comprises the first data communication interface 113, which is configured to receive and transmit data communication objects on the basis of the OPC UA protocol standard 114 from the and/or to the control desk 109. By way of example, the first data communication interface 113 can be an OPC UA protocol standard driver.

The data communication between the control unit 107 and the fieldbus devices 106 is performed on the basis of a suitable fieldbus protocol 116 and the data transfer is realized by way of a suitable fieldbus system 105. By way of example, the fieldbus system 105 can be an EtherCAT system, a PROFIBUS system or another fieldbus system suitable for the respective fieldbus devices 106. To this end, the data communication unit 111 comprises the second data communication interface 115, which is configured to receive and transmit data communication objects on the basis of the fieldbus protocol 116 from the and/or to the fieldbus devices 106. To this end, the second data communication interface 115 can be a fieldbus master driver.

The first data communication interface 113 and the second data communication interface 115 are each connected to the mapping unit 117.

Data communication objects on the basis of the OPC UA protocol standard 114 transmitted by the control desk 109 to one of the fieldbus devices 106 or to a plurality of fieldbus devices 106 are received by the first data communication interface 113 of the data communication unit 111 and are forwarded to the mapping unit 117. Depending on the fieldbus device 106 to which the data communication objects transmitted by the control desk 109 are addressed, the mapping unit 117 chooses the corresponding mapping specification 118 in order to map the respective data communication objects on the basis of the OPC UA protocol standard 114 on data communication objects on the basis of the respective fieldbus protocol 116 in accordance with the corresponding mapping specification 118.

First data communication objects on the basis of the OPC UA protocol standard 114, which are transmitted from the control desk 109 to the first fieldbus device 101, are mapped, in accordance with the first mapping specification 119, by the mapping unit 117 on the data communication objects on the basis of the fieldbus protocol 116 defined in the first mapping specification 119.

Second data communication objects on the basis of the OPC UA protocol standard 114, transmitted by the control desk 109 to the second fieldbus device 103, are mapped by the mapping unit 117 in accordance with the second mapping specification 121 on the data communication objects on the basis of the fieldbus protocol 116 defined in the second mapping specification 121.

Analogously, third data communication objects on the basis of the OPC UA protocol standard 114, transmitted by the control desk 109, are mapped by the mapping unit 117 in accordance with the third mapping specification 122 on the data communication objects on the basis of the fieldbus protocol 116 defined in the third mapping specification 122.

The first data communication objects on the basis of the fieldbus protocol 116, second data communication objects on the basis of the fieldbus protocol 116 and third data communication objects on the basis of the fieldbus protocol 116, mapped by the mapping unit 117 in accordance with the respective mapping specifications 118, are transmitted by the second data communication interface 115 to the corresponding fieldbus devices 106.

To this end and in addition to the specified unique assignments between data communication objects on the basis of the OPC UA protocol standard 114 and data communication objects on the basis of the fieldbus protocol 116, the mapping specifications 118 may further comprise, for each fieldbus device 106, a unique identification and further, in addition to the device identification, a unique device description, which lists individual features of the fieldbus device 106. Further, an individual data structure can be defined in each mapping specification 118 for the corresponding fieldbus device 106, said data structure defining the data communication objects available to the respective fieldbus device 106 for data communication with the control desk 109.

By way of the definition of the data communication objects both on the basis of the OPC UA protocol standard 114 and on the basis of the fieldbus protocol 116, which are exclusively available to the respective fieldbus device 106, the data accessible to the control desk 109 for this specific fieldbus device 106 are set. Data communication between the control desk 109 and one of the fieldbus devices 106 can be realized exclusively via the data communication objects defined in the mapping specification 118 determined for the respective fieldbus device 106.

By contrast, if the control desk 109 transmits a data communication object on the basis of the OPC UA protocol standard 114 to one of the fieldbus devices 106, which data communication object is not defined in the mapping specification 118 determined for the respective fieldbus device 106, the mapping unit 117 is thus unable to map the data communication object on the basis of the OPC UA protocol standard 114, received by the first data communication interface 113, on a corresponding data communication object on the basis of the fieldbus protocol 116 in accordance with the mapping specification 118 of the respective fieldbus device 106, and there is no data communication between the control desk 109 and the respective fieldbus device 106.

Analogously, a data communication object on the basis of the fieldbus protocol 116 transmitted by a fieldbus device 106, which data communication object is not defined in the mapping specification 118 determined for this fieldbus device 106, cannot be mapped by the mapping unit 117 on a corresponding data communication object on the basis of the OPC UA protocol standard 114 in accordance with the respective mapping specification 118, and so there cannot be data communication between the fieldbus device 106 and the control desk 109.

By defining the data communication objects on the basis of the OPC UA protocol standard 114 and the corresponding data communication objects on the basis of the fieldbus protocol 116, available for the data communication between the control desk 109 and one of the fieldbus devices 106, in the mapping specification 118 responsible for the respective fieldbus device 106, it is consequently possible to define, for a fieldbus device 106, the data which can be accessed by the control desk 109. By defining the data communication objects on the basis of the OPC UA protocol standard and the corresponding data communication objects on the basis of the fieldbus protocol 116, available for the data communication between the control desk 109 and the fieldbus device 106, in the mapping specification 118 determined for the respective fieldbus device 106, it is consequently possible to determine the information content that can be exchanged by the data communication between the control desk 109 and the fieldbus device 106. Information content that cannot be expressed by the data communication objects on the basis of the OPC UA protocol standard and the corresponding data communication objects on the basis of the fieldbus protocol 116, which are defined in the mapping specification 118, cannot be transmitted between the control desk 109 and the fieldbus device 106 by way of data communication.

By virtue of the data communication objects on the basis of the OPC UA protocol standard 114 and the corresponding data communication objects on the basis of the fieldbus protocol 116, exclusively available for data communication, being defined individually for each fieldbus device 106 in the mapping specification 118 determined for this fieldbus device 106, the data of the fieldbus device 106 which are accessible to the control desk 109 can be determined individually for each fieldbus device 106. By way of example, this can prevent the control desk 109 from accessing sensitive data of the fieldbus device 106 and transferring such sensitive data via the data bus 108, which can be an Internet connection, for example, said sensitive data consequently possibly being exposed to data misuse.

In the embodiment in FIG. 1, the first mapping specification 119 defines the first data communication objects on the basis of the OPC UA protocol standard 114 and the corresponding first data communication objects on the basis of the fieldbus protocol 116, which are available for the data communication between the control desk 109 and the first fieldbus device 101.

By contrast, the second mapping specification 121 defines only the second data communication objects on the basis of the OPC UA protocol standard 114 and the corresponding second data communication objects on the basis of the fieldbus protocol 116, which are available for the data communication between the control desk 109 and the second fieldbus device 103.

By contrast, the third mapping specification 122 defines only the third data communication objects on the basis of the OPC UA protocol standard 114 and the corresponding third data communication objects on the basis of the fieldbus protocol 116, which are available for the data communication between the control desk 109 and the third fieldbus device 104.

Data communication between the control desk 109 and, for example, the first fieldbus device 101 can consequently be carried out exclusively on the basis of the first mapping specification 119 while data communication between the control desk 109 and the first fieldbus device 101 on the basis of the second mapping specification 121 or on the basis of the third mapping specification 122 is not possible.

However, as an alternative to the embodiment shown in FIG. 1, it is possible to define a mapping specification 118 that determines data communication objects which facilitate data communication between the control desk 109 and a plurality of fieldbus devices 106. By way of example, this is advantageous in the case where the automation system 100 has a plurality of fieldbus devices 106 of the same type, for which identical data communication objects can be used for data communication between the fieldbus devices 106 and the control desk 109. To this end, the corresponding mapping specification 118 can comprise device identifications and device descriptions for the fieldbus devices 106 of identical type. Consequently, data communication between the control desk 109 and one of the fieldbus devices 106 or a plurality of the fieldbus devices 106 can be carried out on the basis of identical data communication objects by way of the mapping specification 118.

As an alternative to the embodiment shown in FIG. 1, the control unit 107 can further comprise a plurality of data communication units 111, which each have a first data communication interface 113, a second data communication interface 115 and at least one mapping unit 117. Further, at least one mapping specification 118 can be installed in each mapping unit 117, and so data communication between the control desk 109 and at least one fieldbus device 106 can be provided via each of the plurality of data communication units 111.

Alternatively, a plurality of mapping units 117 can be arranged in a data communication unit 111, at least one mapping specification 118 having been installed in each mapping unit 117. The individual mapping units 117 are each connected to the first data communication interface 113 and the second data communication interface 115 of the data communication unit 111, and so data communication between the control desk 109 and at least one fieldbus device 106 is realizable via each mapping unit 117 in accordance with the mapping specification 118 installed thereon.

By way of example, the data communication unit 111 can be an OPC UA protocol standard server.

As an alternative to the embodiment in FIG. 1, the control desk 109 can comprise a plurality of items of data processing equipment. Each of the plurality of items of data processing equipment can be connected via the data bus 108 to the data communication unit 111 or to one of the plurality of data communication units 111 of the control unit 107 such that each of the items of data processing equipment of the control desk 109 can be used to provide data communication with at least one of the fieldbus devices 106 by the data communication unit 111 and at least one of the mapping units 117 arranged thereon.

Figure 2:
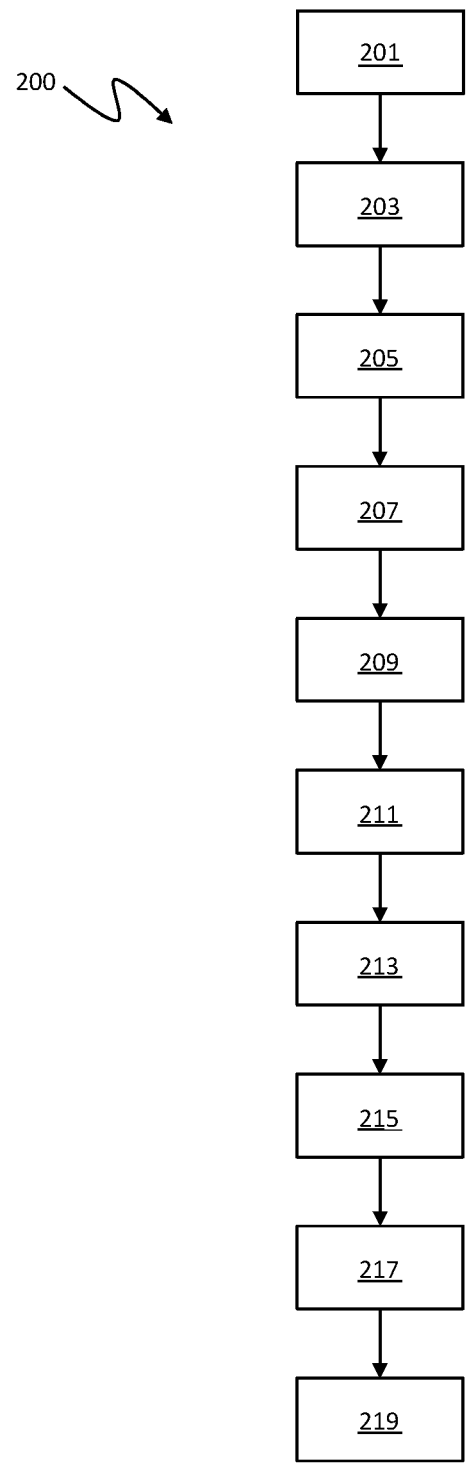
FIG. 2 shows a flowchart of a method for data communication between fieldbus devices and a control desk of an automation system according to one embodiment.

FIG. 2 shows a flowchart of a method 200 for data communication between fieldbus devices 106 and a control desk 109 of an automation system 100 according to one embodiment.

According to the embodiment in FIG. 2, the automation system 100 comprises at least a first fieldbus device 101, a second fieldbus device 103, a control unit 107 connected via a fieldbus system 105 to the first fieldbus device 101 and the second fieldbus device 103 for controlling the first fieldbus device 101 and the second fieldbus device 103, and a control desk 109. The control unit 107 comprises a data communication unit 111 for data communication between the first fieldbus device 101, the second fieldbus device 103 and the control desk 109 by way of the exchange of data communication objects. The data communication unit 111 has a first data communication interface 113 connected to the control desk 109 for transmitting and receiving data communication objects on the basis of an OPC UA protocol standard 114, a second data communication interface 115 connected to the first fieldbus device 101 and the second fieldbus device 103 for transmitting and receiving data communication objects on the basis of a fieldbus protocol 116, and a mapping unit 117 connected to the first data communication interface 113 and the second data communication interface 115 for mapping data communication objects on the basis of the OPC UA protocol standard 114 and data communication objects on the basis of the fieldbus protocol 116 on one another.

The mapping unit 117 is configured to map first data communication objects on the basis of the OPC UA protocol standard 114 and first data communication objects on the basis of the fieldbus protocol 116 on one another according to a first mapping specification 119, and to map second data communication objects on the basis of the OPC UA protocol standard 114 and second data communication objects on the basis of the fieldbus protocol 116 on one another according to a second mapping specification 121. The first mapping specification 119 defines a mapping of the first data communication objects on the basis of the OPC UA protocol standard 114 and the first data communication objects on the basis of the fieldbus protocol 116 on one another, and the second mapping specification 121 defines a mapping of the second data communication objects on the basis of the OPC UA protocol standard 114 and the second data communication objects on the basis of the fieldbus protocol 116 on one another.

Alternatively, the automation system 100 can be embodied in accordance with the above described embodiments in relation to FIG. 1.

According to the embodiment in FIG. 2, the method 200 comprises the following method steps:

transmitting, by the control desk 109, first data communication objects on the basis of the OPC UA protocol standard 114 to the first fieldbus device 101 and/or transmitting, by the control desk 109, second data communication objects on the basis of the OPC UA protocol standard 114 to the second fieldbus device 103 in a first transmission step 201;

receiving the first data communication objects on the basis of the OPC UA protocol standard 114 and/or receiving the second data communication objects on the basis of the OPC UA protocol standard 114 by the first data communication interface 113 in a first reception step 203;

mapping the first data communication objects on the basis of the OPC UA protocol standard 114, received by way of the first data communication interface 113, on first data communication objects on the basis of the fieldbus protocol 116 according to the first mapping specification 119 by the mapping unit 117, and/or mapping the second data communication objects on the basis of the OPC UA protocol standard 114, received by way of the first data communication interface, on second data communication objects on the basis of the fieldbus protocol 116 according to the second mapping specification 121 by the mapping unit 117 in a first mapping step 205;

transmitting, by the second data communication interface 115, the first data communication objects on the basis of the fieldbus protocol 116 to the first fieldbus device 101 and/or transmitting, by the second data communication interface 115, the second data communication objects on the basis of the fieldbus protocol 116 to the second fieldbus device 103 in a second transmission step 207; and receiving the first data communication objects on the basis of the fieldbus protocol 116 by the first fieldbus device 101 and/or receiving the second data communication objects on the basis of the fieldbus protocol 116 by the second fieldbus device 103 in a second reception step 209.

The method 200 further comprises the method steps of:

transmitting first data communication objects on the basis of the fieldbus protocol 116 by the first fieldbus device 101 and/or transmitting second data communication objects on the basis of the fieldbus protocol 116 by the second fieldbus device 103 to the control desk 109 in a third transmission step 211;

receiving the first data communication objects on the basis of the fieldbus protocol 116 and/or the second data communication objects on the basis of the fieldbus protocol 116 by the second data communication interface 115 in a third reception step 213;

mapping the first data communication objects on the basis of the fieldbus protocol 116, received by way of the second data communication interface 115, on first data communication objects on the basis of the OPC UA protocol standard 114 according to the first mapping specification 119 by the mapping unit 117, and/or mapping the second data communication objects on the basis of the fieldbus protocol 116, received by way of the second data communication interface 115, on second data communication objects on the basis of the OPC UA protocol standard 114 according to the second mapping specification 121 by the mapping unit 117 in a second mapping step 215;

transmitting, by the first data communication interface 113, the first data communication objects on the basis of the OPC UA protocol standard 114 and/or transmitting, by the first data communication interface 113, the second data communication objects on the basis of the OPC UA protocol standard 114 to the control desk 109 in a fourth transmission step 217; and receiving the first data communication objects on the basis of the OPC UA protocol standard 114 and/or receiving the second data communication objects on the basis of the OPC UA protocol standard 114 by the control desk 109 in a fourth reception step 219.

In a manner analogous to the embodiments of the automation system 100 described with respect to FIG. 1, the automation system 100 can have further fieldbus devices 106 in addition to the first fieldbus device 101 and the second fieldbus device 103.

A mapping specification 118 can be installed in the data communication unit 111 for each fieldbus device 106, and so data communication is realizable between the control desk 109 and the fieldbus device 106 in accordance with the respective mapping specification 118. Each mapping specification 118 can define data communication objects for data communication between the control desk 109 and the specified fieldbus device 106.

By way of example, the third mapping specification 122 is installed in the data communication unit 111 for the third fieldbus device 104. The third mapping specification 122 defines third data communication objects on the basis of the OPC UA protocol standard 114 and third data communication objects on the basis of the fieldbus protocol 116; these completely define the data communication between the control desk 109 and the third fieldbus device 104.

The data communication between the control desk 109 and the third fieldbus device 104, for example, is implemented by the method 200 in a manner analogous to the data communication, described there, between the control desk 109 and the first fieldbus device 101 and the second fieldbus device 103.

For data communication between the control desk 109 and a fieldbus device 106, the control desk 109 transmits appropriate data communication objects on the basis of the OPC UA protocol standard 114 to the respective fieldbus devices 106 in a first transmission step 201. The data transfer is implemented by way of a data bus 108, which can be an ethernet system, for example, and can provide an Internet connection.

In a first reception step 203, the data communication unit 111 receives via the first data communication interface 113 the transmitted data communication objects on the basis of the OPC UA protocol standard 114 and forwards these to the mapping unit 117.

In a first mapping step 205, the mapping unit 117 maps, in accordance with an appropriate mapping specification 118, the received data communication objects on the basis of the OPC UA protocol standard 114 on corresponding data communication objects on the basis of the fieldbus protocol 116, which are defined in the mapping specification 118. First data communication objects on the basis of the OPC UA protocol standard 114, which are addressed to the first fieldbus device 101, are mapped in accordance with the first mapping specification 119 by the mapping unit 117 on the first data communication objects on the basis of the fieldbus protocol 116 defined therein.

The data communication objects on the basis of the OPC UA protocol standard 114, addressed to the second fieldbus device 103, the third fieldbus device 104 or a further fieldbus device 106, are mapped in accordance with the second mapping specification 121, the third mapping specification 122 or a further mapping specification 118 by the mapping unit 117 on the data communication objects on the basis of the fieldbus protocol 116 defined therein.

In a second transmission step 207, the data communication objects on the basis of the fieldbus protocol 116, mapped by the mapping unit 117, are transmitted to the corresponding fieldbus devices 106. The first data communication objects on the basis of the fieldbus protocol 116 are consequently transmitted to the first fieldbus device 101 while the second data communication objects, the third data communication objects or further data communication objects on the basis of the fieldbus protocol 116 are transmitted to the second fieldbus device 103, the third fieldbus device 104 or a further fieldbus device 106.

In a second reception step 209, the fieldbus devices 106 receive the data communication objects on the basis of the fieldbus protocol 116 addressed thereto.

According to the embodiment in FIG. 2, the method 200 further provides data communication, within the scope of which fieldbus devices 106 transmit data communication objects to the control desk 109. This can be implemented independently of the data communication objects previously transmitted from the control desk 109 to the fieldbus devices 106. Alternatively, the data communication objects transmitted by the fieldbus devices 106 to the control desk 109 can be a response to the data communication objects previously transmitted by the control desk 109. Alternatively, the temporal sequence can be reversed by virtue of the data communication objects transmitted by the control desk 109 being a response to data communication objects previously transmitted by the fieldbus devices 106.

According to the embodiment in FIG. 2, at least one fieldbus device 106, for example the first fieldbus device 101 or the second fieldbus device 103, transmits data communication objects on the basis of the fieldbus protocol 116 to the control desk 109 in a third transmission step 211, with the first fieldbus device 101 transmitting first data communication objects on the basis of the fieldbus protocol 116 and the second fieldbus device 103 transmitting second data communication objects on the basis of the fieldbus protocol 116 and, for example, the third fieldbus device 104 analogously transmitting third data communication objects on the basis of the fieldbus protocol 116.

In a third reception step 213, the data communication unit 111 receives via the second data communication interface 115 the data communication objects on the basis of the fieldbus protocol 116 transmitted by the fieldbus devices 106 and forwards these to the mapping unit 117.

In a second mapping step 215, the mapping unit 117 maps, in accordance with the appropriate mapping specifications 118, the received data communication objects on the basis of the fieldbus protocol 116 on the data communication objects on the basis of the OPC UA protocol standard 114, which are defined in the mapping specifications 118.

By way of example, the mapping unit 117 maps, in accordance with the first mapping specification 119, the first data communication objects on the basis of the fieldbus protocol 116 transmitted by the first fieldbus device 101 on the first data communication objects on the basis of the OPC UA protocol standard 114, which are defined in said mapping specification.

Analogously, the mapping unit 117 maps, in accordance with the second mapping specification 121 and third mapping specification 122, the second and third data communication objects on the basis of the fieldbus protocol 116, transmitted by the second fieldbus device 103 and by the third fieldbus device 104, respectively, on the second data communication objects on the basis of the OPC UA protocol standard 114 and on the third data communication objects on the basis of the OPC UA protocol standard 114, which are defined in said mapping specifications.

As already described above, the data communication objects of the individual fieldbus devices 106 may differ from one another. By way of example, this can be traced back to the fact that the fieldbus devices 106 are devices of different types such that the information transmitted by way of the data communication objects varies between the fieldbus devices 106 on account of the types. By way of example, one fieldbus device 106 can be embodied as a sensor while a further fieldbus device 106 is embodied as an actuator. The data communication objects received and transmitted by the sensor or actuator, or the information transmitted or received by the sensor or the actuator, consequently varies solely on account of the differing type of the two fieldbus devices 106.

Further, the data communication objects available for data communication can be defined individually for each fieldbus device 106 in the mapping specifications 118, and so, even on account of the different data communication objects available for data communication which are defined in the respective mapping specification 118, said data communication objects can be different for different fieldbus devices 106.

In a fourth transmission step 217, the first data communication interface 113 transmits the data communication objects on the basis of the OPC UA protocol standard 114, mapped by the mapping unit 117, to the control desk 109 via the data bus 108.

In a fourth reception step 219, the control desk 109 receives the transmitted data communication objects on the basis of the OPC UA protocol standard 114. Consequently, it is possible to obtain data communication, in particular information transfer from the fieldbus devices 106 to the control desk 109.

By mapping the data communication objects on the basis of the OPC UA protocol standard 114 and the data communication objects on the basis of the fieldbus protocol 116 by the mapping unit 117 in accordance with the mapping specifications 118 installed thereon, the original information content of the originally transmitted data communication objects is maintained. Despite the conversion of the data communication objects on the basis of the one data communication protocol to data communication objects on the basis of the respective other data communication protocol by the mapping unit 117, the semantic content of the original information remains unchanged and can be transmitted between the two communication subscribers.

As a result of the conversion of the data communication objects on the basis of the data communication protocol of the transmitter to data communication objects on the basis of the data communication protocol of the receiver, it is consequently possible for the information transmitted by the transmitter to be read in unmodified fashion by the receiver. By way of example, the information transmitted by the control desk 109 in the form of the data communication objects on the basis of the OPC UA protocol standard 114, in the mapping by the mapping unit 117 in accordance with the mapping specification 118, is expressed by corresponding data communication objects on the basis of the fieldbus protocol 116, with the information content and the semantic content of the originally transmitted information being maintained. The mapped data communication objects on the basis of the fieldbus protocol 116 can be read by the addressed fieldbus device 106 and the information contained therein can be interpreted.

Analogously, information from one fieldbus device 106 can be expressed by information objects on the basis of the OPC UA protocol standard 114 as a result of transmission of appropriate data communication objects on the basis of the fieldbus protocol 116 and consequently said information can be transferred to the control desk 109.

To this end, the mapping specifications 118 can comprise an appropriate unique assignment between data communication objects on the basis of the OPC UA protocol standard 114 and data communication objects on the basis of the used fieldbus protocol 116. Moreover, the mapping specifications 118 can define the available data communication objects on the basis of the OPC UA protocol standard 114 and the corresponding data communication objects on the basis of the fieldbus protocol 116, and so the information to be transmitted between the control desk 109 and the corresponding fieldbus device 106 can be defined by way of the defined data communication objects.

Moreover, the mapping specification 118 can comprise a device identification of the respectively corresponding fieldbus device 106. Alternatively, the mapping specification 118 can comprise a device description of the fieldbus device 106 with a description of the features of the fieldbus device 106.

As already presented in relation to FIG. 1, a plurality of different mapping specifications 118 can be installed in the data communication unit 111. Each of the mapping specifications 118 can define data communication or the data communication objects available for data communication for a fieldbus device 106. Alternatively, a mapping specification 118 can define data communication objects for a plurality of identical fieldbus devices 106, and so data communication between the control desk 109 and a plurality of fieldbus devices 106 can be realized by one mapping specification 118.

Alternatively, the data communication unit 111 can have a plurality of mapping units 117. Each of the plurality of mapping units 117 can comprise at least one mapping specification 118 in each case. For data communication between the control desk 109 and a fieldbus device 106, a mapping of the data communication objects on the basis of the OPC UA protocol standard 114 and the data communication objects on the basis of the fieldbus protocol 116 is carried out by way of the mapping unit 117 of the plurality of mapping units 117 on which the mapping specification 118 corresponding to the specific fieldbus device 106 is installed.

Alternatively, a plurality of data communication units 111 can be arranged on the control unit 107, each data communication unit 111 having a first data communication interface 113, a second data communication interface 115 and at least one mapping unit 117. At least one mapping specification 118 can be installed on each data communication unit 111. Data communication between the control desk 109 and a certain fieldbus device 106 then occurs by way of the corresponding data communication unit 111 on which the mapping specification 118 defined for the specific fieldbus device 106 has been installed. The individual data communication units 111 can communicate among themselves.

According to one embodiment, a data communication unit 111 can have an installation unit 123 such that mapping specifications 118 can be installed on the data communication unit 111 via the installation unit 123. Mapping specifications 118 already installed on the data communication unit 111 can be modified by way of an installation of modified mapping specifications 118 by the installation unit 123.

According to one embodiment, the data bus 108 can be embodied as an ethernet system and a data transfer can be realized by way of an Internet connection.

By way of example, the fieldbus system 105 can be an EtherCAT system, a PROFIBUS system or another fieldbus system suitable for the respective fieldbus devices 106 of the automation system 100. Accordingly, the fieldbus protocol 116 then is an EtherCAT protocol, a PROFIBUS protocol or another suitable fieldbus protocol.

By way of example, the fieldbus devices 106 can be a sensor or an actuator or any device of a field plane of the automation system 100.

The control desk 109 can be an item of data processing equipment, in particular a PC, a laptop, a mobile device or a cloud system or server system. Alternatively, the control desk 109 can comprise a plurality of items of data processing equipment, which are each connected by the data bus 108 to the control unit 107 such that data communication with the fieldbus devices 106 of the automation system 100 as per the method 200 is facilitated by way of each item of data processing equipment of the control desk 109.

By way of example, the first data communication interface 113 can be an OPC UA driver and the second data communication interface 115 can be a fieldbus master driver. In this context, the fieldbus devices 106 can be fieldbus slaves.

Figure 3:
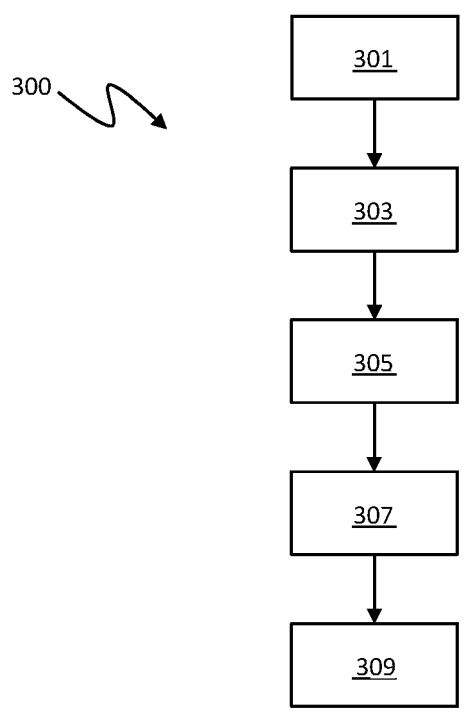
FIG. 3 shows a flowchart of a further method for data communication between fieldbus devices and a control desk of an automation system according to one embodiment.

FIG. 3 shows a flowchart of a further method 300 for data communication between fieldbus devices 106 and a control desk 109 of an automation system 100 according to one embodiment.

According to the embodiment in FIG. 3, the automation system 100 comprises at least a first fieldbus device 101, a second fieldbus device 103, a control unit 107 connected via a fieldbus system 105 to the first fieldbus device 101 and the second fieldbus device 103 for controlling the first fieldbus device 101 and the second fieldbus device 103, and a control desk 109. The control unit 107 comprises a data communication unit 111 for data communication between the first fieldbus device 101, the second fieldbus device 103 and the control desk 109 by way of the exchange of data communication objects. The data communication unit 111 has a first data communication interface 113 connected to the control desk 109 for transmitting and receiving data communication objects on the basis of an OPC UA protocol standard 114, a second data communication interface 115 connected to the first fieldbus device 101 and the second fieldbus device 103 for transmitting and receiving data communication objects on the basis of a fieldbus protocol 116, and a mapping unit 117 connected to the first data communication interface 113 and the second data communication interface 115 for mapping data communication objects on the basis of the OPC UA protocol standard 114 and data communication objects on the basis of the fieldbus protocol 116 on one another.

The mapping unit 117 is configured to map first data communication objects on the basis of the OPC UA protocol standard 114 and first data communication objects on the basis of the fieldbus protocol 116 on one another according to a first mapping specification 119, and to map second data communication objects on the basis of the OPC UA protocol standard 114 and second data communication objects on the basis of the fieldbus protocol 116 on one another according to a second mapping specification 121. The first mapping specification 119 defines a mapping of the first data communication objects on the basis of the OPC UA protocol standard 114 and the first data communication objects on the basis of the fieldbus protocol 116 on one another, and the second mapping specification 121 defines a mapping of the second data communication objects on the basis of the OPC UA protocol standard 114 and the second data communication objects on the basis of the fieldbus protocol 116 on one another.

Alternatively, the automation system 100 can be embodied in accordance with the above described embodiments in relation to FIG. 1.

According to the embodiment in FIG. 3, the method 300 comprises the following method steps:

transmitting first data communication objects on the basis of the fieldbus protocol 116 by the first fieldbus device 101 and/or transmitting second data communication objects on the basis of the fieldbus protocol 116 by the second fieldbus device 103 to the control desk 109 in a first signal transmission step 301;

receiving the first data communication objects on the basis of the fieldbus protocol 116 and/or the second data communication objects on the basis of the fieldbus protocol 116 by the second data communication interface 115 in a first signal reception step 303;

mapping the first data communication objects on the basis of the fieldbus protocol 116, received by way of the second data communication interface 115, on first data communication objects on the basis of the OPC UA protocol standard 114 according to the first mapping specification 119 by the mapping unit 117, and/or mapping the second data communication objects on the basis of the fieldbus protocol 116, received by way of the second data communication interface 115, on second data communication objects on the basis of the OPC UA protocol standard 114 according to the second mapping specification 121 by the mapping unit 117 in a data communication object mapping step 305;

transmitting, by the first data communication interface 113, the first data communication objects on the basis of the OPC UA protocol standard 114 and/or transmitting, by the first data communication interface 113, the second data communication objects on the basis of the OPC UA protocol standard 114 to the control desk 109 in a second signal transmission step 307; and receiving the first data communication objects on the basis of the OPC UA protocol standard 114 and/or receiving the second data communication objects on the basis of the OPC UA protocol standard 114 by the control desk 109 in a second signal reception step 309.

The first signal transmission step 301 can correspond to the third transmission step 211 with all the features described in relation to FIG. 2. The first signal reception step 303 can correspond to the third reception step 213 with all the features described in relation to FIG. 2. The data communication object mapping step 305 can correspond to the second mapping step 215 with all the features described in relation to FIG. 2.

The second signal transmission step 307 can correspond to the fourth transmission step 217 with all the features described in relation to FIG. 2. The second signal reception step 309 can correspond to the fourth reception step 219 with all the features described in relation to FIG. 2.

TABLE 1

List of reference signs 100 automation system
101 first fieldbus device
103 second fieldbus device
104 third fieldbus device
105 fieldbus system
106 fieldbus device
107 control unit
108 data bus
109 control desk
111 data communication unit
113 first data communication interface
114 OPC UA protocol standard
115 second data communication interface
116 fieldbus protocol
117 mapping unit
118 mapping specification
119 first mapping specification
121 second mapping specification
122 third mapping specification
123 installation unit
200 Method for data communication
201 first transmission step
203 first reception step
205 first mapping step
207 second transmission step
209 second reception step
211 third transmission step
213 third reception step
215 second mapping step
217 fourth transmission step
219 fourth reception step
300 Method for data communication
301 first signal transmission step
303 first signal reception step
305 data communication object mapping step
307 second signal transmission step
309 second signal reception step

What is claimed:

1. A method for data communication between fieldbus devices and a control desk of an automation system,
wherein the automation system comprises a first fieldbus device, a second fieldbus device, a control unit, connected via a fieldbus system to the first fieldbus device and the second fieldbus device, for controlling the first fieldbus device and the second fieldbus device, and a control desk connected to the control unit by a data bus,
wherein the control unit comprises a data communication unit for data communication between the first fieldbus device, the second fieldbus device and the control desk by way of the exchange of data communication objects,
wherein the data communication unit has a first data communication interface, connected to the control desk, for transmitting and receiving data communication objects on the basis of an Open Platform Communication Unified Architecture (OPC UA) protocol standard, a second data communication interface, connected to the first fieldbus device and the second fieldbus device, for transmitting and receiving data communication objects on the basis of a fieldbus protocol and a mapping unit, connected to the first data communication interface and the second data communication interface, for mapping data communication objects on the basis of the OPC UA protocol standard and data communication objects on the basis of the fieldbus protocol on one another,
wherein the mapping unit is configured to map first data communication objects on the basis of the OPC UA protocol standard and first data communication objects on the basis of the fieldbus protocol on one another according to a first mapping specification, and to map second data communication objects on the basis of the OPC UA protocol standard and second data communication objects on the basis of the fieldbus protocol on one another according to a second mapping specification,
wherein the first mapping specification defines a mapping of the first data communication objects on the basis of the OPC UA protocol standard and the first data communication objects on the basis of the fieldbus protocol on one another,
wherein the second mapping specification defines a mapping of the second data communication objects on the basis of the OPC UA protocol standard and the second data communication objects on the basis of the fieldbus protocol on one another,
wherein in the first mapping specification, the first data communication objects on the basis of the OPC UA protocol standard and the first data communication objects on the basis of the fieldbus protocol to be used in the data communication between the control desk and the first field device are defined, and
wherein in the second mapping specification the second data communication objects on the basis of the OPC UA protocol standard and the second data communication objects on the basis of the fieldbus protocol to be used in the data communication between the control desk and the second field device are defined, wherein the fieldbus protocol used in the data communications with the second fieldbus device is the fieldbus protocol used in the data communications with the first fieldbus device, the method comprising:
transmitting, by the control desk, first data communication objects on the basis of the OPC UA protocol standard to the first fieldbus device and/or transmitting, by the control desk, second data communication objects on the basis of the OPC UA protocol standard to the second fieldbus device in a first transmission step;
receiving the first data communication objects on the basis of the OPC UA protocol standard and/or receiving the second data communication objects on the basis of the OPC UA protocol standard by the first data communication interface in a first reception step;
mapping the first data communication objects on the basis of the OPC UA protocol standard, received by way of the first data communication interface, on first data communication objects on the basis of the fieldbus protocol according to the first mapping specification by the mapping unit and/or mapping the second data communication objects on the basis of the OPC UA protocol standard, received by way of the first data communication interface, on second data communication objects on the basis of the fieldbus protocol according to the second mapping specification by the mapping unit in a first mapping step;
transmitting, by the second data communication interface, the first data communication objects on the basis of the fieldbus protocol to the first fieldbus device and/or transmitting, by the second data communication interface, the second data communication objects on the basis of the fieldbus protocol to the second fieldbus device in a second transmission step; and receiving the first data communication objects on the basis of the fieldbus protocol by the first fieldbus device and/or receiving the second data communication objects on the basis of the fieldbus protocol by the second fieldbus device in a second reception step.

2. A method according to claim 1, further comprising:

transmitting first data communication objects on the basis of the fieldbus protocol by the first fieldbus device and/or transmitting second data communication objects on the basis of the fieldbus protocol by the second fieldbus device to the control desk in a third transmission step;

receiving the first data communication objects on the basis of the fieldbus protocol and/or the second data communication objects on the basis of the fieldbus protocol by the second data communication interface in a third reception step;

mapping the first data communication objects on the basis of the fieldbus protocol, received by way of the second data communication interface, on first data communication objects on the basis of the OPC UA protocol standard according to the first mapping specification by the mapping unit and/or mapping the second data communication objects on the basis of the fieldbus protocol, received by way of the second data communication interface, on second data communication objects on the basis of the OPC UA protocol standard according to the second mapping specification by the mapping unit in a second mapping step;

transmitting, by the first data communication interface, the first data communication objects on the basis of the OPC UA protocol standard and/or transmitting, by the first data communication interface, the second data communication objects on the basis of the OPC UA protocol standard to the control desk in a fourth transmission step; and receiving the first data communication objects on the basis of the OPC UA protocol standard and/or receiving the second data communication objects on the basis of the OPC UA protocol standard by the control desk in a fourth reception step.

3. A method according to claim 1, wherein the first mapping specification completely determines the first data communication objects on the basis of the OPC UA protocol standard and the first data communication objects on the basis of the fieldbus protocol for data communication between the control desk and the first fieldbus device, and wherein the second mapping specification completely determines the second data communication objects on the basis of the OPC UA protocol standard and the second data communication objects on the basis of the fieldbus protocol for data communication between the control desk and the second fieldbus device.

4. A method according to claim 3, wherein data communication between the control desk and the first fieldbus device is restricted to an exchange of the first data communication objects, comprised by the first mapping specification, and wherein data communication between the control desk and the second fieldbus device is exclusively restricted to an exchange of the second data communication objects, comprised by the second mapping specification.

5. A method according to claim 1, wherein the first mapping specification is individually adapted to data communication between the control desk and the first fieldbus device, wherein the second mapping specification is individually adapted to data communication between the control desk and the second fieldbus device, and wherein the first mapping specification and the second mapping specification differ by at least one data communication object, which is exclusively comprised by the first mapping specification or the second mapping specification.

6. A method according claim 1, wherein the data communication unit further comprises an installation unit for installing mapping specifications, wherein the first mapping specification and second mapping specification are installed in the data communication unit by way of the installation unit, and wherein the first mapping specification and second mapping specification are modifiable by way of an installation of modified mapping specifications.

7. A method according to claim 6, wherein a plurality of mapping specifications for data communication between the control desk and a plurality of fieldbus devices are installable by way of the installation unit in the data communication unit, and wherein the data communication objects for at least one of the fieldbus devices are completely determined by each mapping specification.

8. A method according to claim 1, wherein the data communication objects for a plurality of fieldbus devices are completely determined by a mapping specification.

9. A method according to claim 1, wherein the control unit has a plurality of data communication units, each with a first data communication interface, a second data communication interface and a mapping unit, wherein a mapping specification or a plurality of mapping specifications is installed in the mapping unit of each data communication unit, and wherein data communication between the control desk and a fieldbus device or a plurality of fieldbus devices is facilitated by way of each data communication unit.

10. A method according to claim 1, wherein the first fieldbus device and the second fieldbus device are a bus terminal, a sensor, an actuator or any other device of the automation system.

11. A method according claim 1, wherein the control desk is an item of data processing equipment, in particular a personal computer (PC), a laptop or a server unit, of the control level of the automation system and is connected via a data bus to the first data communication interface.

12. A method according to claim 11, wherein the control desk comprises a plurality of items of data processing equipment which are connected to the first data communication interface, and wherein the data communication unit is configured to provide a plurality of data communication instances between the plurality of items of external data processing equipment and the fieldbus devices of the automation system.

13. An automation system, comprising:
a first fieldbus device,
a second fieldbus device,
a control unit, connected via a fieldbus system to the first fieldbus device and the second fieldbus device, for controlling the first fieldbus device and the second fieldbus device, and
a control desk connected to the control unit via a data bus and a data communication unit, configured in the control unit, for data communication between the first fieldbus device, the second fieldbus device and the control desk by way of an exchange of data communication objects,
wherein the data communication unit comprises:
a first data communication interface, connected to the control desk, for transmitting and receiving data communication objects on the basis of the OPC UA protocol standard;

a second data communication interface, connected to the first fieldbus device and the second fieldbus device, for transmitting and receiving data communication objects on the basis of a same fieldbus protocol, wherein the fieldbus protocol on which transmitting and receiving data communication objects is based for the second fieldbus device is the fieldbus protocol on which transmitting and receiving data communication objects is based for the second fieldbus device; and a mapping unit, connected to the first data communication interface and the second data communication interface and configured to map data communication objects on the basis of an Open Platform Communication Unified Architecture (OPC UA) protocol standard and data communication objects on the basis of the fieldbus protocol on one another, wherein the data communication unit is configured:

to receive first data communication objects, transmitted from the control desk to the first fieldbus device, on the basis of the OPC UA protocol standard and/or second data communication objects, transmitted from the control desk to the second fieldbus device, on the basis of the OPC UA protocol standard via the first data communication interface, to map the first data communication objects on the basis of the OPC UA protocol standard on first data communication objects on the basis of the fieldbus protocol according to a first mapping specification by way of the mapping unit and/or to map the second data communication objects on the basis of the OPC UA protocol standard on second data communication objects on the basis of the fieldbus protocol according to a second mapping specification by way of the mapping unit, and to transmit, by the second data communication interface, the first data communication objects on the basis of the fieldbus protocol to the first fieldbus device and/or the second data communication objects on the basis of the fieldbus protocol to the second fieldbus device, wherein the first mapping specification defines a mapping of the first data communication objects on the basis of the OPC UA protocol standard and the first data communication objects on the basis of the fieldbus protocol on one another, wherein the second mapping specification defines a mapping of the second data communication objects on the basis of the OPC UA protocol standard and the second data communication objects on the basis of the fieldbus protocol on one another, wherein in the first mapping specification, the first data communication objects on the basis of the OPC UA protocol standard and the first data communication objects on the basis of the fieldbus protocol to be used in the data communication objects on the basis of the fieldbus protocol to be used in the data communication between the control desk and the first field device are defined, and wherein in the second mapping specification the second data communication objects on the basis of the OPC UA protocol standard and the second data communication objects on the basis of the fieldbus protocol to be used in the data communication between the control desk and the second field device are defined.

14. An automation system according to claim 13, wherein the data communication unit is further configured:

to receive first data communication objects, transmitted from the first fieldbus device to the control desk, on the basis of the fieldbus protocol and/or second data communication objects, transmitted from the second fieldbus device to the control desk, on the basis of the fieldbus protocol via the second data communication interface, to map the first data communication objects on the basis of the fieldbus protocol on first data communication objects on the basis of the OPC UA protocol standard according to the first mapping specification by way of the mapping unit and/or to map the second data communication objects on the basis of the fieldbus protocol on second data communication objects on the basis of the OPC UA protocol standard according to the second mapping specification by way of the mapping unit, and to transmit the first data communication objects on the basis of the OPC UA protocol standard and/or the second data communication objects on the basis of the OPC UA protocol standard to the control desk by the first data communication interface.

15. An automation system according to claim 13, wherein the first mapping specification is individually adapted to data communication between the control desk and the first fieldbus device, wherein the second mapping specification is individually adapted to data communication between the control desk and the second fieldbus device, and wherein the first mapping specification and the second mapping specification differ by at least one data communication object, which is exclusively comprised by the first mapping specification or the second mapping specification.

* * * * *